United States Patent
Sankararaman et al.

(10) Patent No.: US 9,032,514 B1
(45) Date of Patent: May 12, 2015

(54) POTENTIAL DATA LEAKAGE REPORTING SYSTEM, METHOD, AND COMPUTER PROGRAM PRODUCT

(75) Inventors: Srinivasan Sankararaman, Bangalore (IN); Deepakeswaran Kolingivadi, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1171 days.

(21) Appl. No.: 11/842,841

(22) Filed: Aug. 21, 2007

(51) Int. Cl.
*H04L 29/06* (2006.01)

(52) U.S. Cl.
CPC ........ *H04L 63/1408* (2013.01); *H04L 63/1425* (2013.01)

(58) Field of Classification Search
USPC ............................. 726/3, 22; 706/15; 709/224
See application file for complete search history.

(56) References Cited

U.S. PATENT DOCUMENTS

| | | | |
|---|---|---|---|
| 6,839,850 B1 * | 1/2005 | Campbell et al. ............... | 726/23 |
| 7,376,969 B1 * | 5/2008 | Njemanze et al. .............. | 726/22 |
| 2001/0039579 A1 * | 11/2001 | Trcka et al. .................... | 709/224 |
| 2004/0083389 A1 * | 4/2004 | Yoshida ......................... | 713/201 |
| 2005/0027980 A1 * | 2/2005 | Peled et al. .................... | 713/164 |
| 2005/0203881 A1 * | 9/2005 | Sakamoto et al. ................ | 707/3 |
| 2005/0289219 A1 * | 12/2005 | Nazzal .......................... | 709/203 |
| 2006/0272024 A1 * | 11/2006 | Huang et al. ................... | 726/26 |
| 2007/0022090 A1 * | 1/2007 | Graham ........................ | 707/1 |
| 2008/0271143 A1 * | 10/2008 | Stephens et al. ................ | 726/22 |

OTHER PUBLICATIONS

Crosbie, Mark, and Eugene H. Spafford. "Defending a computer system using autonomous agents." (1995).*

* cited by examiner

*Primary Examiner* — Vikkram Bali
*Assistant Examiner* — Tracy Mangialaschi
(74) *Attorney, Agent, or Firm* — Wong, Cabello, Lutsch, Rutherford & Brucculeri LLP.

(57) ABSTRACT

A reporting system, method, and computer program product are provided with respect to occurrences of potential data leakage. In use, a plurality of occurrences of potential data leakage is identified based on user behavior. In addition, a report is provided based on a determination of whether an aspect of the plurality of occurrences exceeds a predetermined threshold.

14 Claims, 8 Drawing Sheets

| DLP SOLUTION SETTINGS 700 | | | | |
|---|---|---|---|---|
| MAILS | | HTTP | | FTP |
| INTERNAL | EXTERNAL | BLOGS | FORUMS | SITES |
| WORDS/PHRASES | WORDS/PHRASES | HTTP://- | HTTP://- | FTP:// |
| TONE/LANGUAGE | RECIPIENT DOMAINS | --- | --- | --- |
| # OF FWD'S | # OF FWD'S | (URL'S) | (URL'S) | --- |
| MSG CHARACTERISTICS | TONE/LANGUAGE | --- | --- | --- |
| JUNK EMAILS | MSG CHARACTERISTICS | --- | --- | --- |
| | .....ETC. | | | |
| | | | APPLY | |

FIGURE 7

| TIME | OCCURRENCE | ACCESS | TYPE | WEIGHT | RUNNING SCORE | THRESHOLD |
|---|---|---|---|---|---|---|
| T1 | OCC1 | HTTP | EXTERNAL | HIGH | | XXXX |
| T2 | OCC2 | MAIL | INTERNAL | LOW | | XXXX |
| T2 | | | | | | |
| T3 | | | | | CROSSED THRESHOLD | WARNING |
| | | | | | | |
| | | | | | | |

POTENTIAL DATA LEAKAGE REPORTING SYSTEM, METHOD, AND COMPUTER PROGRAM PRODUCT

FIELD OF THE INVENTION

The present invention relates to data leakage, and more particularly to identifying occurrences of data leakage.

BACKGROUND

Security systems have generally been developed for detecting unwanted activity. For example, the unwanted activity has sometimes included data leakage, such as unauthorized disclosure of confidential data, etc. However, such security systems have generally exhibited various limitations in proactively identifying a potential for such data leakage.

There is thus a need for addressing these and/or other issues associated with the prior art.

SUMMARY

A reporting system, method, and computer program product are provided with respect to occurrences of potential data leakage. In use, a plurality of occurrences of potential data leakage is identified based on user behavior. In addition, a report is provided based on a determination of whether an aspect of the plurality of occurrences exceeds a predetermined threshold.

BRIEF DESCRIPTION OF THE DRAWINGS

FIG. 7 shows a graphical user interface for configuring data leakage prevention settings, in accordance with another embodiment.

FIG. 8 shows a graphical user interface for reporting occurrences of potential data leakage, in accordance with yet another embodiment.

DETAILED DESCRIPTION

Figure 1:
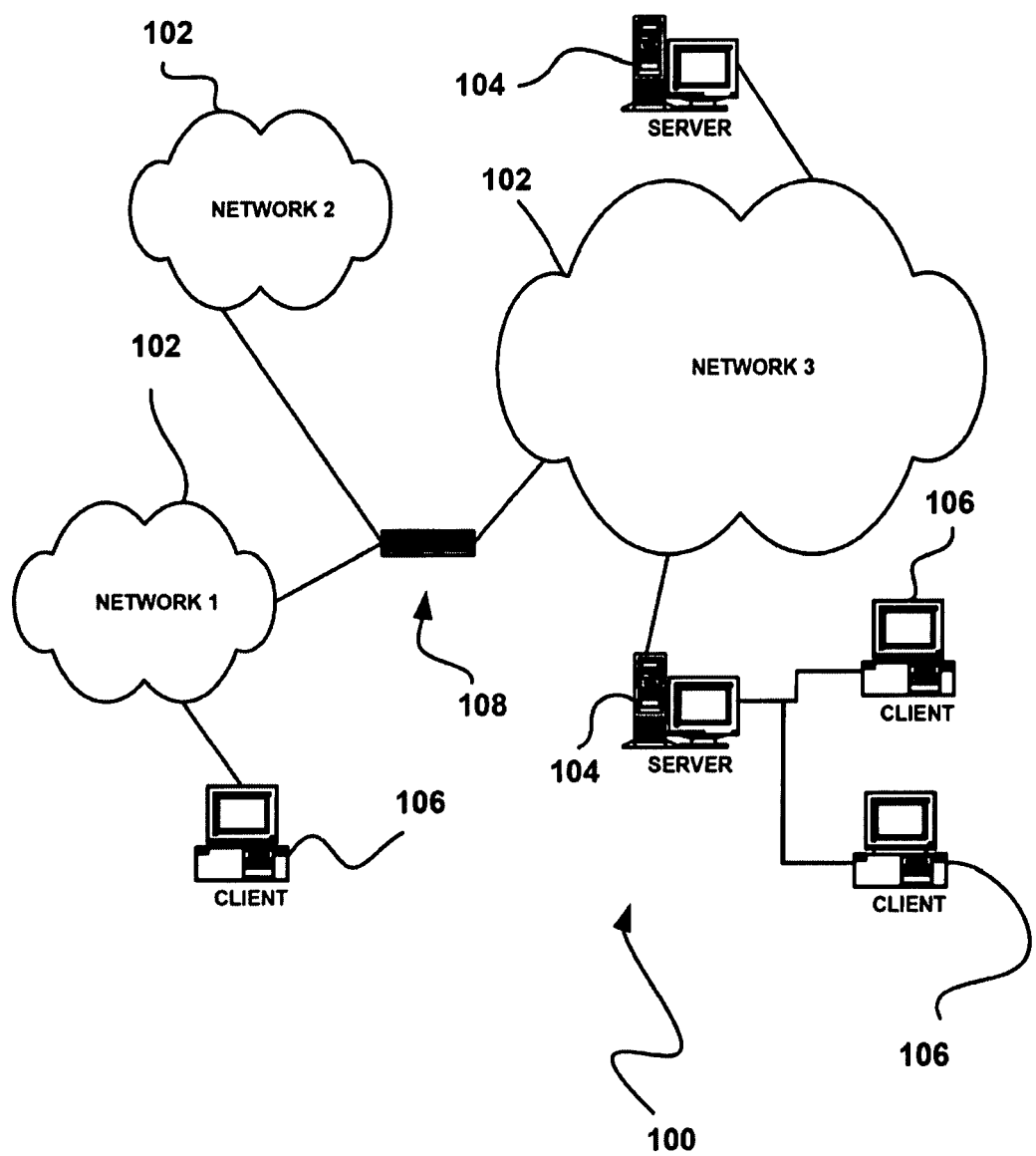
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
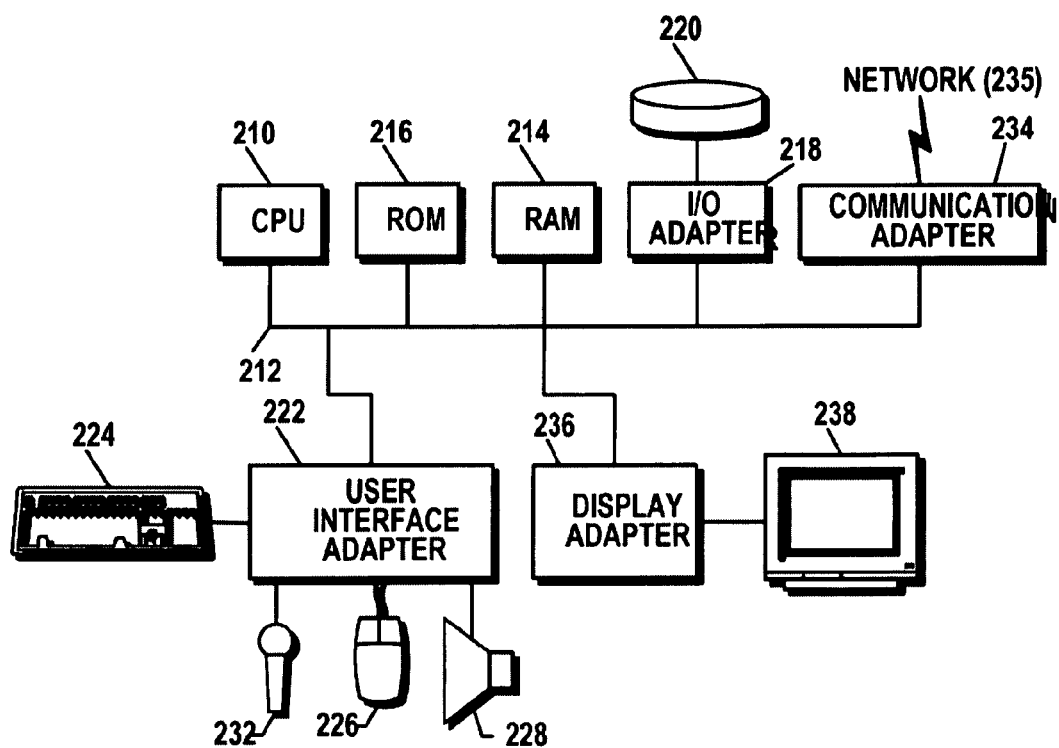
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
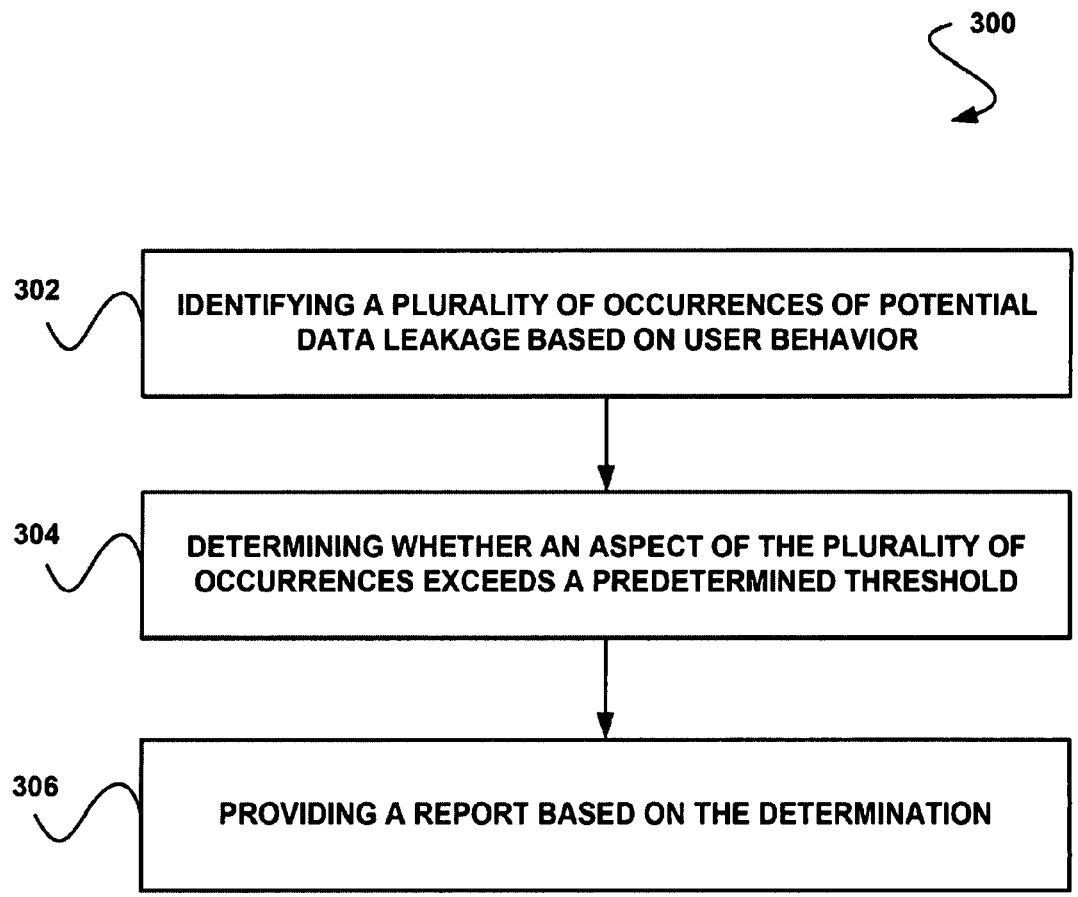
FIG. 3 shows a reporting method associated with occurrences of potential data leakage, in accordance with one embodiment.

FIG. 3 shows reporting method 300 associated with occurrences of potential data leakage, in accordance with one embodiment. As an option, the reporting method 300 may be carried out in the context of the architecture and environment of FIGS. 1 and/or 2. Of course, however, the reporting method 300 may be carried out in any desired environment.

As shown in operation 302, a plurality of occurrences of potential data leakage is identified based on user behavior. In the context of the present embodiment, the user behavior may include any actions, activity, etc. associated with a user. For example, in various embodiments, the user behavior may include accessing a network forum, accessing a blog (e.g. a web log), inputting data into the blog, accessing a website, including words and/or phrases in an electronic mail (email) message, including a type of language in an email message, sharing information over a network, forwarding junk email messages, accessing a personal email message account, etc.

Additionally, the occurrences of potential data leakage may each include an instance, single activity, etc. of the user behavior that at least potentially indicates data leakage. Such data leakage may include any unwanted disclosure of data, loss of data, etc. To this end, the occurrences of potential data leakage may optionally include sending an email message (e.g. from the personal email message account, etc.), sharing information in the network forum, inputting data into the blog, sending an email message with words and/or phrases that match predetermined words and/or phrases, etc.

In one embodiment, the user behavior, and thus the occurrences of potential data leakage, may be identified utilizing an agent (e.g. application, etc.). For example, such agent may be capable of monitoring the user behavior. In another embodiment, a plurality of agents may be utilized for identifying the user behavior.

In yet another embodiment, each of the plurality of agents may be associated with (e.g. installed on, etc.) a different device on a network for identifying user behavior performed utilizing an associated device. The devices may include a desktop computer, an exchange server, a gateway and/or any of the devices described above with respect to FIGS. 1 and/or 2, for example. Further, the network may include any of the networks described above with respect to FIG. 1.

In still yet another embodiment, each of the agents may be configured to identify predetermined types of user behavior, and thus predetermined types of occurrences of potential data leakage. For example, an agent on the gateway may be configured to identify user behavior capable of being performed utilizing the gateway, an agent on the desktop may be configured to identify user behavior capable of being performed utilizing the desktop computer, and so forth. Of course, the predetermined types of user behavior (and predetermined types of occurrences of potential data leakage) that an agent is configured to identify may be user configured (e.g. utilizing a user interface, etc.).

As also shown, it is determined whether an aspect of the plurality of occurrences exceeds a predetermined threshold. Note decision 304. In the context of the present description, the aspect may include any information (e.g. characteristic, attribute, etc.) associated with the occurrences of potential data leakage. In one embodiment, the aspect may include a number of the plurality of occurrences. Thus, the identification of an occurrence of potential data leakage may incrementally increase the number.

In another embodiment, the aspect may include a score associated with the occurrences of potential data leakage. As an option, the score may be a function of the occurrences of potential data leakage. As another option, the score may be based on a weight of each of the occurrences of potential data leakage. For example, the score may include the cumulative weight of such occurrences.

In one embodiment, the weight may be particular to the type of occurrence. For example, different types of occurrences may be predetermined to be associated with (e.g. assigned, etc.) different weights. Such weights may be predetermined automatically and/or manually (e.g. by an administrator, etc.). As another example, the weights may be determined utilizing an algorithm. For example, the algorithm may be used to compute the weight of an occurrence based on characteristics of the occurrence.

Optionally, the weights may indicate a level of potential of the data leakage associated with the occurrences. To this end, a higher weight may indicate a higher level of potential of data leakage than a lower weight. Just by way of example, occurrences based on user activity that remains within an internal network (e.g. a LAN, etc.), such as sending an email message within the internal network, may be associated with a lower weight than occurrences based on user activity that is associated with an external network (e.g. a WAN, etc.), such as sending an email message outside of the local area network.

Still yet, the predetermined threshold may include any value capable of being exceeded by the aspect of the occurrences of potential data leakage. For example, the predetermined threshold may include a number, in one embodiment. In another embodiment, the predetermined threshold may be user-defined (e.g. utilizing a user interface, etc.).

It should be noted that it may be determined whether the aspect of the occurrences exceeds the predetermined threshold in any desired manner. In one embodiment, the aspect may be compared with the predetermined threshold. Just by way of example, a score of the occurrences of potential data leakage may be compared with the predetermined threshold for determining whether such score exceeds the predetermined threshold.

Moreover, a report is provided based on the determination, as shown in operation 306. With respect to the present embodiment, the report may include any information, data, etc. capable of being provided. For example, the report may include a log, a document, a form, a notification, etc.

In one embodiment, the report may be provided if it is determined that the aspect of the occurrences of potential data leakage exceeds the threshold. In another embodiment, the report may identify such occurrences of potential data leakage. As an option, the report may include the data contained in the occurrences of potential data leakage, such as an email message, a blog posted online, etc. In still yet other various embodiments, the report may indicate a date, time, user, internet protocol (IP) address, user account, network location and/or any other information capable of being associated with the occurrences of potential data leakage.

Optionally, the report may be provided to an administrator, an application, the user associated with the occurrences of potential unwanted activity, etc. For example, the report may be provided for analysis of the occurrences of potential unwanted activity (e.g. automatic analysis utilizing the application, manual analysis by a user, etc.). In this way, a probability of future potential data leakage (e.g. associated with the user) may be proactively identified based on an analysis of the report. Further, an action may be performed based on such probability, such as preventing activity associated with the potential data leakage, removing controls on activity associated with the potential data leakage, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
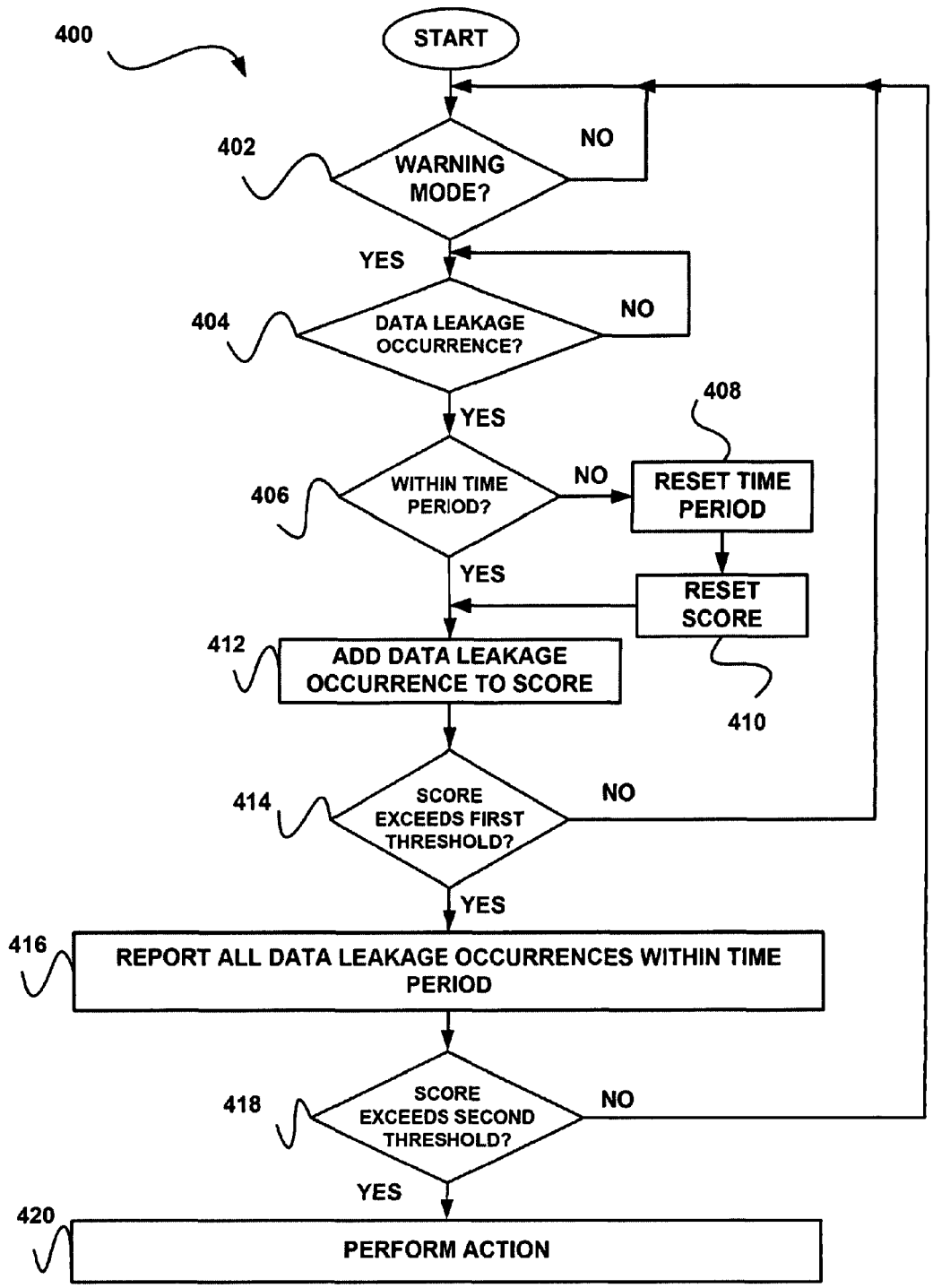
FIG. 4 shows a method for reporting data leakage occurrences, in accordance with another embodiment.

FIG. 4 shows method 400 for reporting data leakage occurrences, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether a warning mode is enabled. In the context of the present embodiment, the warning mode (e.g. proactive mode) may be any mode in which data leakage occurrences are identified based on user behavior. Thus, data leakage occurrences may only be identified if the warning mode is enabled.

In one embodiment, the warning mode may be enabled manually by a user. For example, the warning mode may be enabled by selecting a setting provided in a user interface. In another embodiment, the warning mode may be enabled automatically. Just by way of example, the warning mode may be enabled based on predefined rules (e.g. time of day, etc.).

In response to a determination that the warning mode is enabled, it is determined whether a data leakage occurrence has been identified. Note decision 404. With respect to the current embodiment, the data leakage occurrence is identified based on user behavior. For example, the data leakage occurrence may include a user action included in the user behavior.

Further, in response to a determination that a data leakage occurrence has been identified, it is determined whether such data leakage occurrence is identified within a time period, as shown in decision 406. The time period may include a predetermined time period, in one embodiment. For example, the time period may be defined by a user. In another embodiment, the predetermined time period may include a time period in which a previous data leakage occurrence was identified. For example, it may be determined whether the data leakage occurrence is identified within the same time period (e.g. one hour, etc.) as a previous data leakage occurrence.

If it is determined that the data leakage occurrence did not occur within the time period, the time period is reset, as shown in operation 408. As an option, the time period may be reset by setting a timer to zero. Of course, however, the time period may be reset in any manner.

In addition, as shown in operation 410, a score is reset. In the context of the present embodiment, the score may include a score associated with data leakage occurrences. For example, the score may include a cumulative weight of data leakage occurrences within the time period. As another example, the score may include a number of data leakage occurrences within the time period. In one embodiment, the score may be reset to zero.

Still yet, the data leakage occurrence is added to the score, as shown in operation 412. Such data leakage occurrence may be added to the score by incrementing the score (e.g. by one), in one embodiment. In another embodiment, the data leakage occurrence may be added to the score by adding a weight of the data leakage occurrence to the score. In this way, data leakage occurrences identified within a single time period may be added to the score, such that the score may represent a total of such data leakage occurrences.

As also shown, it is determined whether the score exceeds a first threshold. Note decision 414. The first threshold may be user-defined, in one embodiment. Further, the first threshold may include a highest score in which data leakage occurrences may be identified before such data leakage occurrences are reported.

Accordingly, as shown in operation 416, if it is determined that the score exceeds the first threshold, all data leakage occurrences within the time period are reported. Just by way of example, the data leakage occurrences may be reported to an administrator. As an option, any information associated with the data leakage occurrences may also be reported, such as a time of each of the data leakage occurrences, etc. However, if it is determined that the score does not exceed the threshold, it may be verified whether the warning mode is still enabled (operation 402) for continuing to monitor the user behavior for additional data leakage occurrences.

Moreover, it is determined whether the score exceeds a second threshold, as shown in decision 418. The second threshold may include any threshold that is different from the first threshold. Of course, in another embodiment, the second threshold may be the same as the first threshold, such that decision 416 may be prevented (not shown). As a further option, the second threshold may be user-defined. In one embodiment, the second threshold may be a highest score in which data leakage occurrences may be identified before an action is performed in response to such data leakage occurrences.

Thus, if it is determined that the score does not exceed the second threshold, it may be verified whether the warning mode is still enabled (operation 402) for continuing to monitor the user behavior for additional data leakage occurrences. If, however, it is determined that the score exceeds the second threshold, an action is performed. Note operation 420. As an option, the action may only be performed if a reactive mode is enabled. For example, the reactive mode may be enabled by an administrator utilizing a user interface.

In one embodiment, the action may include preventing future occurrences of data leakage. For example, settings may be implemented such that user behavior associated with the occurrences of data leakage within the time period may be prevented. Of course, however, the action may include any action capable of being performed with respect to such occurrences of data leakage.

Figure 5:
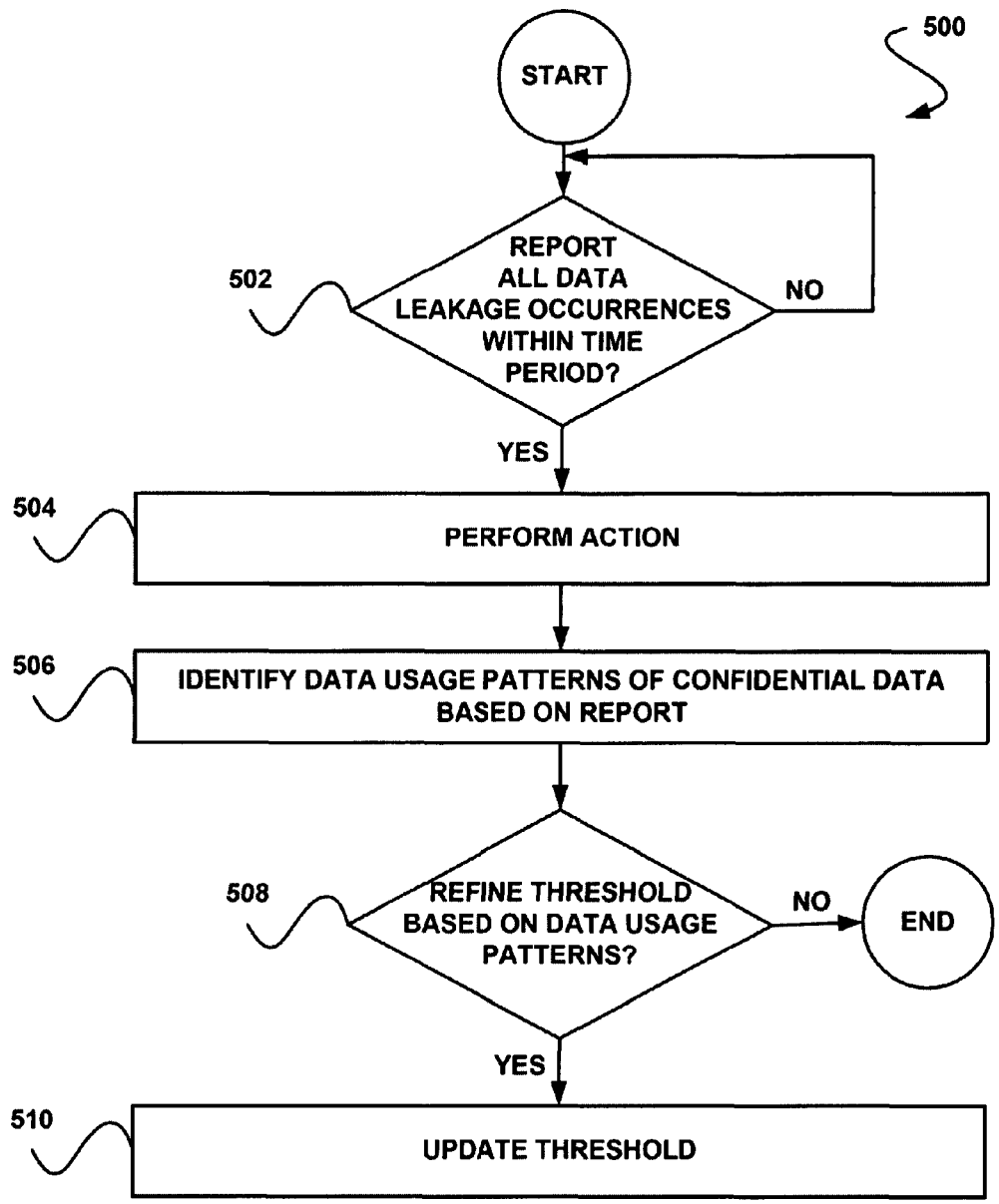
FIG. 5 shows a method for updating a threshold based on data usage patterns, in accordance with yet another embodiment.

FIG. 5 show a method 500 for updating a threshold based on data usage patterns, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown, it is determined whether all data leakage occurrences within a time period have been reported. Note decision 502. In one embodiment, the report may include the report described above with respect to operation 416 of FIG. 4. In another embodiment, the determination may be based on whether a report of such data leakage occurrences has been issued.

In response to a determination that the data leakage occurrences have been reported, an action is performed, as shown in operation 504. In one embodiment, the action may include analyzing the reported data leakage occurrences. Of course, however, the action may include any action capable of being performed with respect to the reported data leakage occurrences.

Further, data usage patterns of confidential data are identified based on the report, as shown in operation 506. Such confidential data may include any data predetermined to be confidential (e.g. unauthorized to be disclosed internally within a network, unauthorized to be disclosed externally with respect to the network, etc.). For example, data may be identified as confidential if such data include predetermined words, phrases, etc. predetermined to indicate confidential data.

In the context of the present embodiment, the data usage patterns may include any patterns of usage by users of the confidential data. For example, the data usage patterns may indicate activities that occurred with respect to the confidential data. In various embodiments, such activities may include sending email messages with confidential data included, uploading confidential data, logging confidential data on blogs, entering confidential data in network forums, etc.

As an option, the data usage patterns may be identified based on the analysis of the report. Further, such analysis may include an automatic analysis performed by an application. For example, the automatic analysis may aggregate similar types of usage of confidential data (e.g. email messages, etc.), similar destinations to which confidential data is sent and/or any other characteristics that may be aggregated with respect to various usages of confidential data. As an option, the data usage patterns may be identified based on predetermined patterns. In this way, a user may configure the types of data usage patterns identified.

Additionally, it is determined whether a threshold is to be refined based on the identified data usage patterns. Note decision 508. Such threshold may include a predetermined threshold to be measured against a score of data leakage occurrences identified within a time period. Moreover, the threshold may indicate whether the report of data leakage occurrences within the time period is to be provided, whether an action is to be performed, etc.

In one embodiment, the determination of whether the threshold is to be refined may be based on user input. For example, an administrator may analyze the identified usage patterns for determining whether the threshold is to be refined. To this end, the user input may be received (e.g. via a user interface, etc.) by selecting an option to refine the threshold. Of course, however, in another embodiment, it may automatically be determined whether the threshold is to be refined. For example, an application may compare the identified usage patterns to another predetermined threshold for determining whether the threshold is to be refined.

Thus, the threshold is updated based on the determination, as shown in operation 510. The threshold may be updated by writing the updated threshold over the threshold. Further, the threshold may be updated based on an updated threshold defined by a user. Optionally, such updated threshold may be inputted to a user interface by the user.

Figure 6:
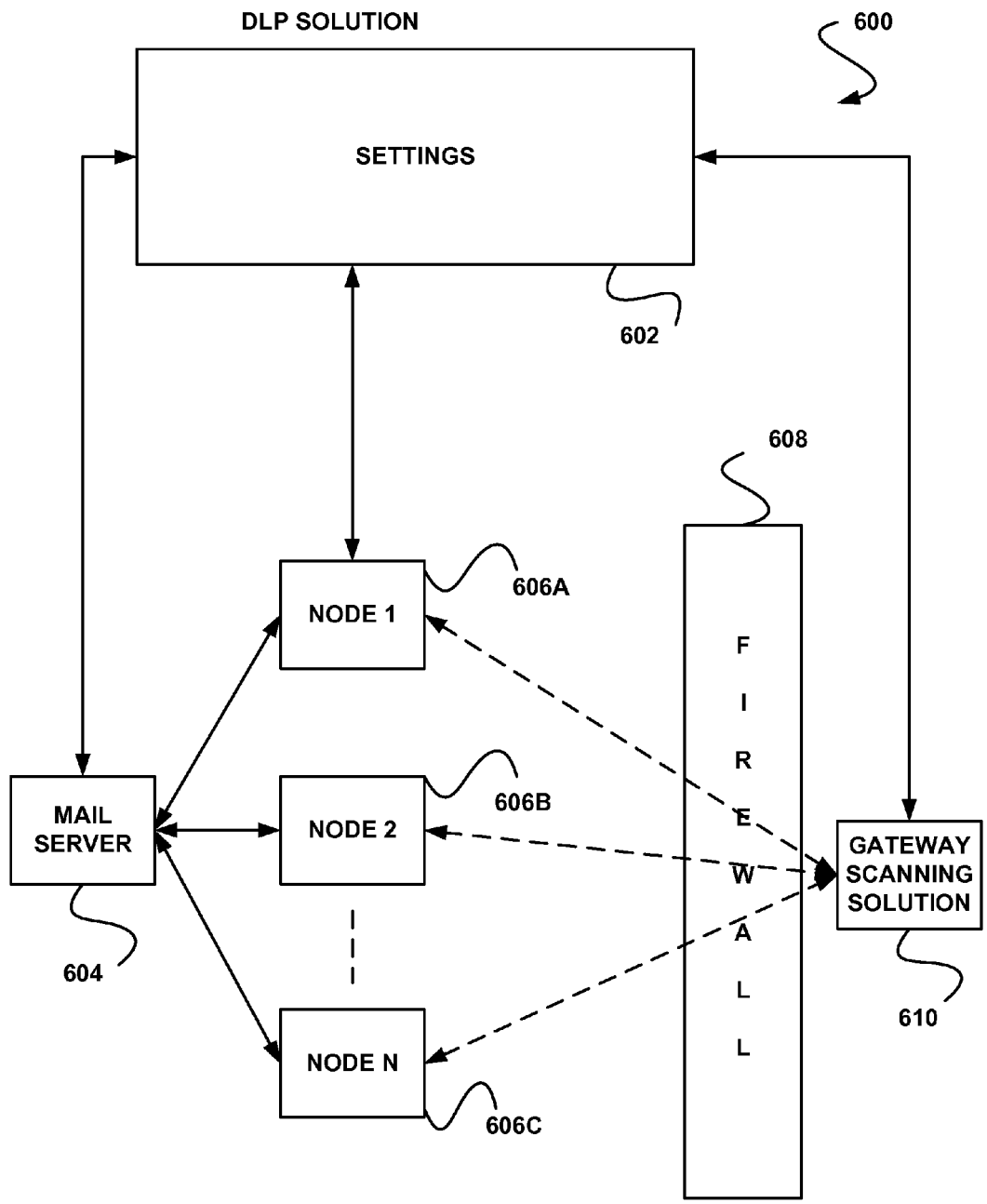
FIG. 6 shows a system for identifying occurrences of potential data leakage, in accordance with still yet another embodiment.

FIG. 6 show a data leakage prevention system 600 for identifying occurrences of potential data leakage, in accordance with still yet another embodiment. As an option, the data leakage prevention system 600 may be implemented in the context of the architecture and environment of FIGS. 1-5. Of course, however, the data leakage prevention system 600 may be implemented in any desired environment. Again, it should also be noted that the aforementioned definitions may apply during the present description.

As shown, a settings module 602 is in communication with a mail server 604 (e.g. via a network). In the context of the present embodiment, the settings module 602 may include any module capable of storing data leakage prevention settings. For example, the settings module 602 may include a database, table, etc. The settings module 602 may optionally be stored on a server (not shown) on the network. Further, such data leakage prevention settings may include settings indicating which types of potential data leakage occurrences to block, a reporting threshold to be compared to an aspect of occurrences of potential data leakage, an action threshold to be compared to an aspect of such occurrences, a time period during which a score of occurrences of potential data leakage is to be accumulated, etc.

In addition, the mail server 604 may include a server for providing an email application. It should be noted that while a mail server 604 is shown, any number other modules and/or devices may also be in communication with the settings module 602. As also shown, the mail server 604 is in communication with a plurality of nodes 606A-N.

The nodes 606A-N may include any devices via which user behavior may be identified. For example, the nodes 606A-N may include any of the devices described above with respect to FIGS. 1 and/or 2. To this end, the mail server 604 may provide an email service to the nodes 606A-N. For example, email messages may be accessed, created, etc. by the nodes 606A-N via the mail server 604.

In one embodiment, the mail server 604 may operate in accordance with the settings in the settings module 602. Optionally, the mail server 604 may prevent associated predefined data leakage occurrences based on the settings. Just by way of example, the mail server 604 may prevent email messages sent to predetermined IP addresses, email addresses that include predetermined words and/or phrases, etc.

Furthermore, the nodes 606A-N may also be in communication with the settings module 602. While only Node 1 606A is shown in communication with the settings module 602, it should be noted that any and/or all of the nodes 606A-N may be in communication with such settings module 602. In this way, the settings in the settings module 602 may also be applied to the nodes 606A-N. Just by way of example, the settings may prevent the nodes 606A-N from accessing predetermined websites, from sharing information in online forums, from sharing information in blogs, etc.

As further shown, the nodes 606A-N are in communication with a gateway scanning solution 610 via a firewall 608. The gateway scanning solution 610 may be utilized for identifying user behaviors associated with the network. In addition, the gateway scanning solution 610 may be utilized for scanning data transmitted from and/or to the nodes 606A-N over the network. As also shown, the gateway scanning solution 610 is in communication with the settings module 602, such that settings may be communicated from the settings module 602 to the gateway scanning solution 610.

In one embodiment, user behaviors associated with the mail server 604, the nodes 606A-N, and/or the gateway scanning solution 610 may be monitored utilizing agents. Optionally, the agents may be located at any of the mail server 604, the nodes 606A-N, and/or the gateway scanning solution 610. Further, the agents may identify occurrences of potential data leakage based on the monitored user behavior.

In response to identification of such occurrences, information associated with the occurrences may be communicated to the gateway scanning solution 610. For example, the agents may report such occurrences to the gateway scanning solution 610 if it is determined that an aspect of the occurrences exceeds the reporting threshold defined by the settings in the settings module 602 within a time period also defined by such settings.

In response to receiving a report, the gateway scanning solution 610 may identify behavioral usage patterns of confidential data based on such report. The gateway scanning solution 610 may further be utilized to determine whether to refine the reporting threshold (e.g. increase, decrease, etc.). For example, the gateway scanning solution 610 may provide a user interface for allowing a user to refine the reporting threshold. Such user interface may also be utilized for updating any of the settings in the settings module 602.

In another embodiment, the nodes 606A-N, the mail server 604, and/or the gateway scanning solution 610 may perform an action in response to a determination that the aspect of the occurrences exceeds the action threshold defined by the settings in the settings module 602 within the time period. For example, the action may include preventing future occurrences of potential data leakage. In this way, data leakage may be monitored and optionally prevented.

FIG. 7 shows a graphical user interface (GUI) 700 for configuring data leakage prevention settings, in accordance with another embodiment. As an option, the GUI 700 may be implemented in the context of the architecture and environment of FIGS. 1-6. Of course, however, the GUI 700 may be implemented in any desired environment. Again, it should also be noted that the aforementioned definitions may apply during the present description.

As shown, the GUI 700 includes a plurality of data leakage prevention settings that may be configured by a user. In on embodiment, the settings may include the settings included in the settings module 602 of FIG. 6. As shown, the settings may be organized by a type of occurrences of date leakage. For example, the settings may be configured for email communicated internally with respect to a local network and externally with respect to the local network. Such email settings may include identifying words and/or phrases, tone and/or language, a number of forwarded email messages, email message characteristics, junk emails, recipient domains, etc. capable of being indicative of occurrences of data leakage.

In addition, settings may be configured for content accessed on a network. As shown, such network content settings may be configured according to utilization of hypertext transfer protocol (HTTP) or file transfer protocol in accessing network content. The network content may identify specific addresses [e.g. universal resource locators (URLs), etc.] to which access is prevented. Of course, it should be noted that as another option the identified addresses may indicate network content which is allowed to be accessed.

Such settings may be configured by a user utilizing the GUI 700. For example, the user may enter the settings, select the settings from a predefined list of settings, etc. Furthermore, the settings may be implemented in response to a selection of the "apply" option. In this way, the GUI 700 may be utilized for creating, modifying, and/or removing settings.

FIG. 8 shows a GUI 800 for reporting occurrences of potential data leakage, in accordance with yet another embodiment. As an option, the GUI 800 may be implemented in the context of the architecture and environment of FIGS. 1-7. Of course, however, the GUI 800 may be implemented in any desired environment. Again, it should also be noted that the aforementioned definitions may apply during the present description.

The GUI 800 includes a plurality of different types of information associated with occurrences of potential data leakage identified within a time period. In the context of the present embodiment, the GUI 800 may include a report of such occurrences of potential data leakage. Further, the GUI 800 may be displayed to an administrator, a user from which the occurrences of potential data leakage were identified, etc.

As shown, a time of each of the occurrences and a name of such occurrences is provided. The name of each of the occurrences may include a unique identifier of an associated occurrence, in one embodiment. As another option, the name of the occurrences may include a description of the occurrences.

Further, a type of the occurrence is provided. As shown, such type may indicate whether the occurrence was associated with activity external to a local network and/or internal to the local network. A weight of each of the occurrences is also included in the report. The weight may indicate whether the occurrence is a high severity level (e.g. more probable to result in data leakage), a medium severity level (e.g. less probable to result in data leakage than an occurrence with a high severity level), and/or a low severity level (e.g. least probable to result in data leakage). Of course, as another option, the weights may be provided as numeric values (e.g. within a scale of values, etc.).

Furthermore, the GUI 800 may provide a running score for each of the occurrences. The running score may indicate the cumulative score of occurrences at the time of the identified occurrence associated with such running score entry. Moreover, a threshold entry may be provided for indicating which occurrence resulted in the score of occurrences exceeding a predetermined threshold. In this way, the GUI 800 may be utilized for reporting to a user information associated with occurrences of potential data leakage.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying settings related to monitoring one or more computer systems for data leakage, wherein the settings are obtained via a graphical user interface;

receiving, from one or more of a plurality of agents, one or more communications indicating a plurality of occurrences of potential data leakage from a monitored computer system, wherein:

each of the plurality of agents executes on one of a plurality of computer systems other than the monitored computer system, each of the plurality of agents is configured to monitor at least one type of user behavior indicated by the settings, the at least one type of user behavior associated with the one of the plurality of computer systems on which the agent executes, wherein each of the plurality of agents is configured to monitor a different type of behavior, and the plurality of occurrences of data leakage are associated with data transmissions from the monitored computer system;

identifying the plurality of occurrences of potential data leakage based on the one or more types of user behavior monitored by the plurality of agents;

determining, using a processor, whether an aspect of the plurality of occurrences exceeds a first predetermined threshold;

providing a first report of all data leakage occurrences during a monitored time period based on the determination that the aspect of the plurality of occurrences exceeds the first predetermined threshold; and performing a non-report action responsive to a determination that the aspect of the plurality of occurrences exceeds a second predetermined threshold different from the first predetermined threshold.

2. The method of claim 1 further comprising receiving the settings related to data leakage based upon either user input or default values.

3. The method of claim 1 wherein the settings include values corresponding to the first threshold.

4. The method of claim 1 wherein the settings include values corresponding to the first report.

5. The method of claim 1 further comprising the step of providing a second report based on the determination that the aspect of the plurality of occurrences exceeds the second predetermined threshold.

6. The method of claim 1 wherein the settings include values corresponding to the second threshold.

7. The method of claim 6 wherein the settings include values corresponding to the non-report action.

8. One or more non-transitory computer readable media, on which are stored instructions, comprising instructions that when executed cause a computer to:

identify settings related to monitoring one or more computer systems for data leakage, wherein the settings are obtained via a graphical user interface;

receive, from one or more of a plurality of agents, one or more communications indicating a plurality of occurrences of potential data leakage from a monitored computer system, wherein:

each of the plurality of agents executes on one of a plurality of computer systems other than the monitored computer system, each of the plurality of agents is configured to monitor at least one type of user behavior indicated by the settings, the at least one type of user behavior associated with the one of the plurality of computer systems on which the agent executes, wherein each of the plurality of agents is configured to monitor a different type of behavior, and the plurality of occurrences of data leakage are associated with data transmissions from the monitored computer system;

identify the plurality of occurrences of potential data leakage based on certain user behaviors monitored by the plurality of agents and indicated by the settings;

determine whether an aspect of the plurality of occurrences exceeds a first predetermined threshold;

provide a first report of all data leakage occurrences during a monitored time period based on the determination that the aspect of the plurality of occurrences exceeds the first predetermined threshold; and perform a non-report action responsive to a determination that the aspect of the plurality of occurrences exceeds a second predetermined threshold different from the first predetermined threshold.

9. The one or more computer readable media of claim 8, wherein the instructions further comprise instructions that when executed cause the computer to receive the settings related to data leakage based upon either user input or default values.

10. The one or more computer readable media of claim 8 wherein the settings include values corresponding to the first threshold and the first report.

11. The one or more computer readable media of claim 8 wherein the settings include values corresponding to the second threshold.

12. The one or more computer readable media of claim 8, wherein the instructions that when executed case the computer to determine whether an aspect of the plurality of occurrences exceeds a first predetermined threshold comprise instructions that when executed cause the computer to:

increment a score by adding a weight of each identified data leakage occurrence to the score; and determine whether the score exceeds the first predetermined threshold.

13. A system comprising:

a plurality of agents configured to monitor a monitored computer system for occurrences of potential data leakage, wherein:

each of the plurality of agents executes on one of a plurality of computer systems other than the monitored computer system, each of the plurality of agents is configured to monitor the monitored computer system for at least one type of user behavior, the at least one type of user behavior associated with the one of the plurality of computer systems on which the agent executes, wherein each of the plurality of agents is configured to monitor a different type of behavior, and the occurrences of data leakage are associated with data transmissions from the monitored computer system; and a monitoring computing device comprising a processor configured to execute instructions, the instructions comprising instructions that when executed cause the processor to:

identify settings related to monitoring one or more computer systems for data leakage;

receive, from one or more of the plurality of agents, one or more communications indicating a plurality of occurrences of potential data leakage from the monitored computer system, identify the plurality of occurrences of potential data leakage based on certain user behaviors monitored by the plurality of agents, wherein the certain user behaviors are indicated by the settings;

determine whether an aspect of the plurality of occurrences exceeds a first predetermined threshold;

provide a first report of all data leakage occurrences during a monitored time period based on the determination that the aspect of the plurality of occurrences exceeds the first predetermined threshold; and perform a non-report action responsive to a determination that the aspect of the plurality of occurrences exceeds a second predetermined threshold, different from the first predetermined threshold.

14. The system of claim 13 wherein said monitoring computing device identifies the settings related to data leakage based upon either user input or default values.

\* \* \* \* \*